Sept. 11, 1934.       G. H. PRIDE       1,973,098
METHOD AND APPARATUS FOR HANDLING MATERIALS
Filed Jan. 31, 1933       4 Sheets-Sheet 1

INVENTOR
George H. Pride,
BY
ATTORNEYS.

Sept. 11, 1934.   G. H. PRIDE   1,973,098
METHOD AND APPARATUS FOR HANDLING MATERIALS
Filed Jan. 31, 1933   4 Sheets-Sheet 2

INVENTOR
George H. Pride,
BY
ATTORNEYS.

Sept. 11, 1934.   G. H. PRIDE   1,973,098
METHOD AND APPARATUS FOR HANDLING MATERIALS
Filed Jan. 31, 1933   4 Sheets-Sheet 3

INVENTOR
George H. Pride,
BY
Fraser, Myers & Manley
ATTORNEYS.

Sept. 11, 1934. G. H. PRIDE 1,973,098
METHOD AND APPARATUS FOR HANDLING MATERIALS
Filed Jan. 31, 1933 4 Sheets-Sheet 4

INVENTOR
George H. Pride,
BY
Fraser, Myers & Manley
ATTORNEYS.

Patented Sept. 11, 1934

1,973,098

UNITED STATES PATENT OFFICE 1,973,098

METHOD AND APPARATUS FOR HANDLING MATERIALS

George H. Pride, New York, N. Y.

Application January 31, 1933, Serial No. 654,377

44 Claims. (Cl. 214—65)

This invention relates to improvements in the art of handling loads of goods or materials, particularly such as require basal support or which are most conveniently handled in this manner.

The present invention is advantageously employed in the handling of heavy stacks of sheet paper, metal sheets or other articles which, unless effectively supported at various points throughout their basal area, would be subject to objectionable deformation or derangement. The invention is also applicable to the handling of case goods or groups of articles not packed in containers but which are assembled so that the group may be handled as a unit, the articles being loaded upon a bed having the requisite strength to basally support them in predetermined relationship. Loads of brick, hollow tile, and a wide variety of other articles may be conveniently and economically handled by this method, it being understood that the articles may, in addition, be tied or bound together in any suitable manner to prevent them from being jarred out of position in the group or stack during transit. Certain features of the present invention are applicable to the handling of large single blocks of material such as building stone, which, in many instances, is preferably conveyed upon a supporting base instead of slinging it from overhead lifting gear.

An important object of the present invention is to provide a substitute for the conventional carrying skid commonly employed for loads requiring basal support. Such skids comprise a heavy platform made of material having sufficient inherent rigidity to support the load without material deformation. The most common form of skid consists of wooden planking securely fastened to parallel timbers, which may be likened to the runners of a sled. These timbers give longitudinal strength to the platform and also perform the function of supporting the platform at an elevation above the floor so that a lift truck or other elevating device may be operated beneath the platform when it is necessary to raise the load or move it from one point to another. In the conventional use of carrying skids as above described, the load of goods is deposited on the skid, and from the point of origin to the ultimate destination the load travels upon the skid. For example, in a paper mill a stack of paper sheets weighing several hundred pounds, and sometimes as much as two tons, is loaded on the skid. Thereafter a lift truck run beneath the skid platform picks up the loaded skid and conveys it to a motor truck or freight car, where the skid is deposited. When the load reaches its destination it is picked up by another lift truck and moved to the point where the paper is to be used or stored, the load commonly remaining upon the skid throughout the period that it is in transportation or in storage. It will thus be seen that the skid, which ordinarily represents a considerable item in the cost of shipping materials requiring basal support, is tied up for long periods of time, and because it must go with the load to its destination it can only be made available again by returning it to the shipper. In some instances this is done, but ordinarily the skids are thrown away. In shipping paper the skids are ordinarily cut to fit the basal area of the stack, and since a paper manufacturer generally ships many different sizes of sheets, it is generally found to be uneconomical to try to salvage the shipping skids even though the expense of recovering them from the various delivery points were warranted.

The present invention largely avoids the aforesaid disadvantages by dividing the functions formerly performed by the heavy skid, between two specialized devices, one of which consists of a light and inexpensive platen upon which the load continuously rests; the other consisting of a frame or carrier device in which said platen may be anchored during the brief intervals that it is required to perform the function of a load-transferring device. The loaded platen, at all other times, either while in transit or in storage, will normally rest upon a platform, floor or other suitable supporting surface, and in this condition is not required to possess any substantial rigidity. The said platen or load-carrying bed may therefore consist of relatively thin and pliant sheet metal or other light material, which, although possessing little inherent resistance to bending, has sufficient tensile strength to enable the bed to support the load when terminally anchored in the aforesaid frame or carrier.

If the material of the bed is of appropriately high tensile strength for the particular load placed upon it, a slight elevation of the carrying frame in which the bed is terminally anchored, will lift the loaded bed clear of the supporting surface on which it normally rests. If the load requires to be transferred with practically no deformation in the bed, the frame, according to the present invention, permits of applying such tension to the bed that the latter will afford an almost ideally flat support.

When the bed and frame are connected as above indicated, they constitute a support which for most uses is equivalent to that afforded by the conventional rigid carrying skid but with the marked advantage that the part which accompanies the goods in transit or which remains beneath them while such goods are in storage, is a relatively inexpensive, light and compact bed, the detachable supporting frame only being required when the goods are to be transferred from one supporting surface to another. The shipper employing the present invention may thus use a single frame to successively load any desired number of stacks of paper, for example, in a freight car. This single frame may then be shipped with the paper to the receiver, or where a receiver would regularly handle shipments of like character he would have on hand a similar frame for handling the paper at its destination. In the latter case all that would accompany the shipment of paper would be the light supporting beds, which are so inexpensive that they may be discarded after use without entailing any loss comparable to that involved in discarding the conventional rigid wooden carrying skids.

A further object of the invention is to provide a carrying frame which is adjustable in size to fit various loads.

Another object is to provide a frame which may be readily assembled and disassembled so that it does not require to be elevated above the supporting surface in placing it about or removing it from the loaded beds.

The invention further provides a frame which is adapted to engage and securely hold the pliant supporting bed in substantially the basal plane of the goods when the frame and the said bed are resting upon a single flat surface (the floor of a building or platform of a conveyance).

A further object is to provide lifting means associated with the supporting frame in such manner that the latter may be used to lift the loaded bed free of the floor whereby to permit the insertion of a truck beneath the frame or bed. The frame may also be provided with wheels or rollers so that the assembled frame and bed may itself constitute a mobile carrier for the goods.

Another object of the invention is to provide a pliant bed composed of a plurality of strips having sufficient tensile strength to support the load when terminally anchored to the carrying frame, the strips being bound together or formed into a mat or web in such manner that the strips are held in a predetermined relationship so that they may be handled as a unit in laying them upon a loading platform or floor preparatory to receiving the load of goods. This interconnection of the strips also insures their uniform spacing so that their ends will always register with special locking or anchoring means provided on the carrying frame. These latter locking or anchoring devices also constitute a feature of novelty.

Further objects and features of the invention will be made apparent in the following more detailed description, wherein reference is had to the accompanying figures, in which

Fig. 17 is a plan view showing the entire frame of which Fig. 15 is a section, the strip in this instance being shown in a somewhat modified arrangement wherein a single length of strip stock is carried back and forth between the frame ends.

Fig. 24 is a plan view of a further embodiment of the invention wherein the frame is designed to tension sets of strips disposed at right angles to each other.

Figure 1:
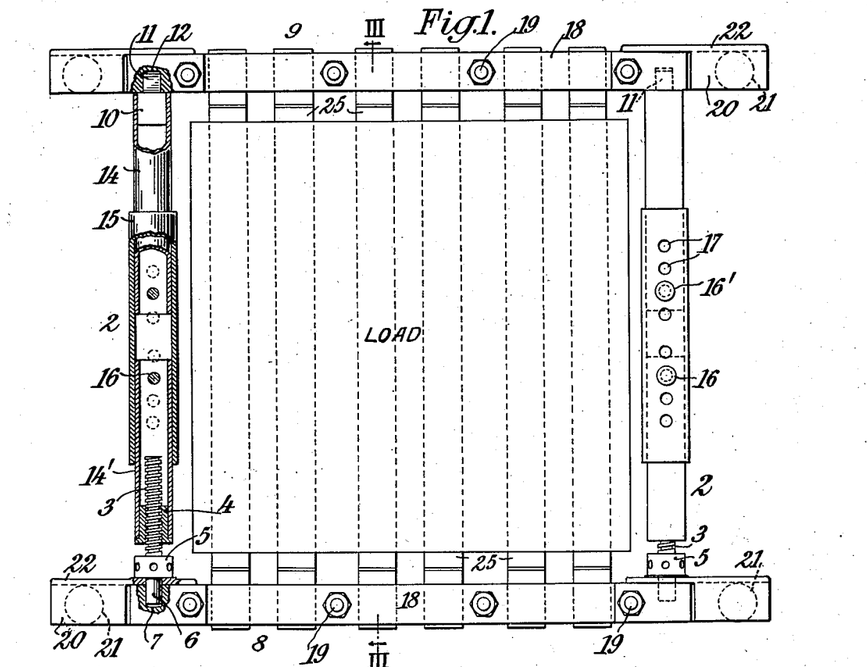
Figs. 1 and 2 are respectively a plan and end view of a demountable load-bearing frame according to the present invention, wherein the load is supported upon a bed of strips anchored to the end members of said frame.

In the embodiment illustrated in Figs. 1-4, inclusive, the rectangular frame in which the pliant bed is secured and tensioned consists of members, which, when assembled, produce a frame which is of sufficient strength to carry heavy loads, the procedure of assembling and disassembling being simple and requiring but little effort. The two sides 2 of the frame may be conveniently formed of pipe or heavy steel tubing and are of identical construction. At the end of each a screw 3 is provided, this being threaded within a bushing 4 rigidly secured in the end of the tubular side member. The screw is provided with a capstan head 5, the unthreaded end 6 projecting beyond the said capstan, fitting within a round bore 7 in one of the end members 8 when the frame is assembled. The arrangement is such that rotation of the screw 3 by means of the capstan head in effect elongates the side 2 of the frame. To prevent the side member from rotating when the screw is turned, the opposite end fits within a squared recess in end member 9. A plug 10 rigidly secured within the tubular side member provides the squared extension 11 which fits within recess 12. For uses in which only a relatively small adjustment is required in the length of the side members, the screw adjustment above described is adequate. In order to provide a greater range of adjustment for accommodating loads of various dimensions, the said members, instead of being made of a single tube, may each be formed of telescoping tubes, as shown in Fig. 1. The two tube sections 14, 14', slide within a central tube section 15, the sections being held in various relative positions by means of pins 16, 16', passing through adjusting holes which are brought into register as the tubes slide one within the other.

Figure 2:
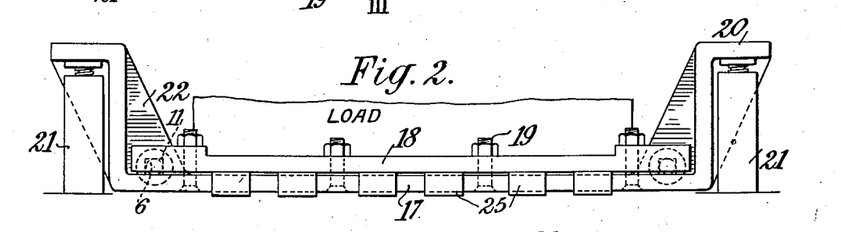

The ends of the frame 8, 9, are alike in every respect except that as hereinbefore described the recesses 7 in one end member are round, while the recesses 12 in the other are square. Each comprises a bottom member 17 which may be a simple flat bar. The upper bar 18 of generally similar cross-section may be brought into clamping relationship with the said bottom member 17 by means of bolts 19 which are permanently secured in the bottom member. These two bars constitute the clamping or locking device by which the pliant bed is secured to the frame, as will hereinafter more fully appear. The ends of bar 17 are turned upwardly and thence outwardly to form rigid "pick-up" members or lifting ears 20 through which the frame and its load may be elevated, as by means of the hydraulic jacks 21 or other forms of jacking or elevating equipment. The "pick-up" members 20 are preferably reinforced by angle plates 22 which may be securely attached to the horizontal and upright portions of bar 17 by welding. It will be noted that the ends of the clamping bar 18 are thickened in order to provide sufficient metal to give adequate support to the ends 6 and 11 of the side members which project therewithin. The bar 18 may be forged with the thickened ends, as shown, or heavy plates may be welded to the bar ends to build up the required cross-section.

The pliant bed upon which the load is disposed may take a wide variety of forms. In its preferred embodiment the bed comprises a plurality of strips or ribbons 25 of material, which, although of light and flexible character, have sufficient tensile strength to support the load when the bed is anchored in the carrying frame. For most uses the commercial steel strip or "hoop" iron commonly used for baling purposes is found to be most satisfactory. The required number and width of the strips depends largely upon the weight and character of the load to be carried. If the goods are of such character as to require continuous support throughout their entire basal area, a single sheet may be substituted for the multiple strips. In carrying stacked paper, adequate basal support is afforded by strips from one to two inches in width spaced apart from four to six inches or even more where the paper is of the character of cardboard which has considerable inherent stiffness. Similarly in carrying loads of thin metal sheets, support is required only along more widely spaced lines to afford adequate suspension whereby the sheets are protected from any local bending strains which would disarrange the stack or result in objectionable deformation of the sheets themselves. Obviously for carrying light loads the pliant bed may consist of canvas or various forms of webbing, including wire mesh, the only requirement being that the material of the bed shall have sufficient tensile strength to carry the load. The bed when locked in the carrying frame provides a character of support by virtue of its tensile strength, which affords a highly satisfactory and inexpensive substitute for the rigid skid platforms now in use. This bed is referred to herein as a "pliant" bed to distinguish it from the rigid beds commonly used and to indicate that its supporting effect is due in large measure to its tensile strength instead of to the inherent rigidity of its material. Ordinarily the fact that the bed is of a pliant character does not add to its usefulness, its yielding nature being a mere incident of the method of support characterizing the present invention, whereby a very compact and light bed is substituted for the heavy, bulky and more expensive rigid beds now in use.

While the pliant bed comprising, for example, the six strips or ribbons 25 as shown in Fig. 1, may be made by simply laying out the individual strips in the desired arrangement prior to depositing the load of goods thereon, it is preferable, particularly if a number of beds of the same size are to be employed for loads of like character, to have the strips bound together so as to form what may be termed a mat. Such a mat may be handled more easily than a plurality of individual strips and makes possible the appropriate positioning of the entire strip bed in a single operation.

Figures 4, 20, 23:
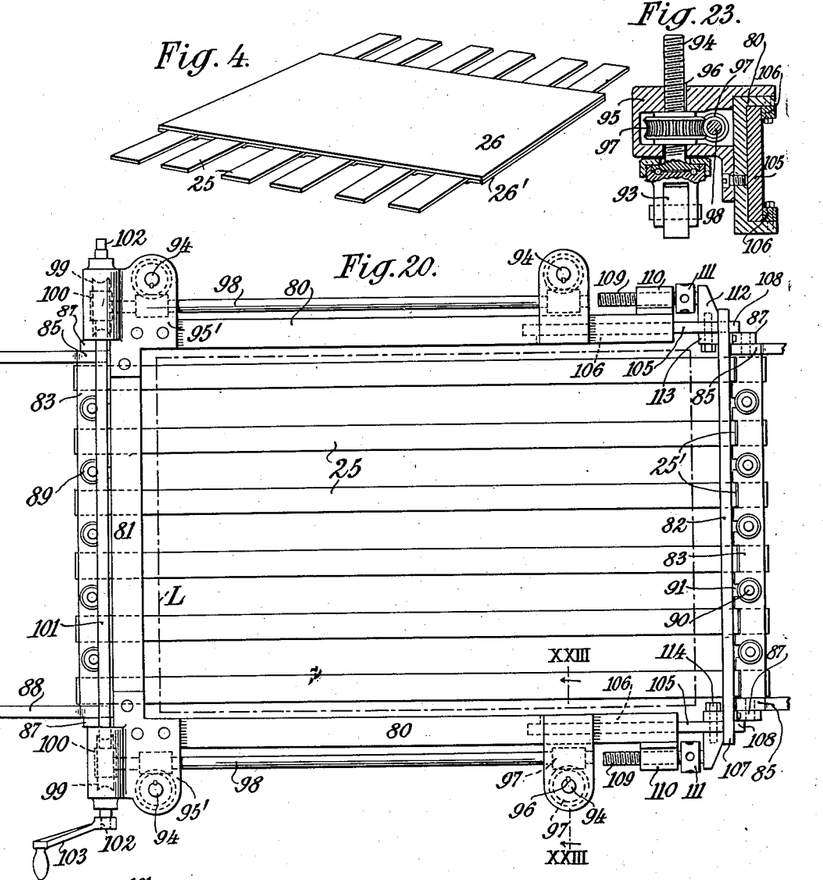
Fig. 4 is a perspective view showing an arrangement of supporting strips formed into a mat, such mat being adapted for use in a frame like that shown in Figs. 1 to 3, for example.
Figs. 20 and 21 are respectively a plan and side elevation of a further embodiment of the invention wherein the frame is provided with built-in lifting means and running gear to permit of elevating and conveying the load from point to point without any additional apparatus.
Fig. 23 is a vertical fragmentary cross-section taken along line XXIII—XXIII of Fig. 20.

A convenient method of forming such a mat is shown, for example, in Fig. 4. The strips 25 in this instance are cemented between two sheets of cardboard 26, 26', these requiring only to be of sufficient strength to permit the handling of the mat in laying it on the floor or loading platform where it is to receive the goods. If cardboard is used, the mat affords a degree of protection against marring the bottom of goods deposited thereon. Obviously should greater protection be required the mat may be made of stronger and thicker material. It is obvious that a single sheet of material will suffice to hold the strips in desired relationship although any number of sheets may be employed, and the strips may be secured to the mat in a variety of ways other than by cementing, as, for example, by lacing or riveting.

The arrangement of strips above described is illustrative of but one form of pliant bed according to the present invention. Various other arrangements will hereinafter be described in which the strips are arranged in other than parallel relationship. The strips may also constitute endless loops; or the entire bed or any section comprising a number of strips may be formed from a single length of strip stock wound back and forth so as to provide looped ends which may be anchored to the members of the supporting frame in various ways. It will be apparent that in all such modified arrangements of the supporting strips which are assembled to form a pliant bed, the strips may be secured in a predetermined relationship by binding them into a mat in the manner hereinbefore described, so that the entire bed may be handled as a unit.

Figure 3:
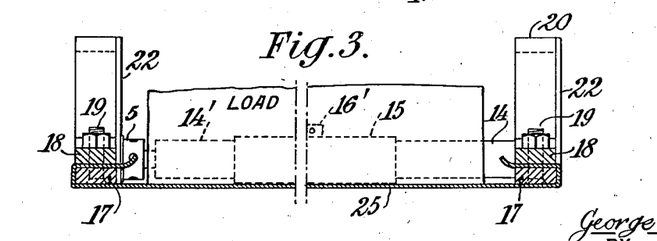
Fig. 3 is a vertical cross-section taken along the line III—III of Fig. 1.

The operation of securing the strips 25 in the frame shown in Figs. 1, 2 and 3, involves nothing more than the simple clamping of the strips between the upper and lower bars 17, 18, which form the ends of the frame. Ordinarily the load would be deposited upon the bed before the frame is assembled. When the load is ready to be moved, the bars 17 are laid over the projecting ends of strips 25. The strip ends are brought up and around the lower bar, as indicated in Fig. 3, being then securely clamped by the upper bar 18 which is put in place and tightened down by means of the clamping bolts 19. The side members 2 of the frame may be put in place either before or after the clamping bars 18 have been tightened on the ends of the strips. After the strips have been secured in the manner indicated they are stretched taut by turning adjusting screws 3 in the side members, the tension thus developed having the effect of binding the assembled frame members securely together and at the same time putting the supporting strips 25 under stress. The strips may thus be tensioned to present a substantially flat supporting surface or bed when carrying the superimposed load. If the load is not of such a character as to require a nearly flat supporting surface the strips 25 need not be tensioned at all, the adjustable side members of the frame being merely elongated sufficiently by means of screws 3 to insure the proper engagement of the ends 6, 11, thereof within the recesses in the end members of the frame. For carrying stacks of paper sheets or goods requiring a substantially flat supporting base, the adjusting screws are sufficiently powerful to tension the strips so that even under heavy loads the strips develop but an almost imperceptible sag.

With the parts assembled in the manner described, the load is ready to be moved, the procedure depending upon the character of the operation required and the various lifting and conveying facilities that may be afforded at various depots. By the use of jacks 21 the frame may be elevated sufficiently to permit running a low hand truck beneath the load, the jacks being then removed and the load conveyed on the truck to the floor of a freight car or other vehicle, for example, if the goods are to be shipped immediately. The load is deposited on the vehicle floor by simply jacking up the frame slightly to permit the withdrawal of the hand truck, the frame being then lowered until the load is supported by the floor. Thereupon the clamping bars 18 are released and the frame removed, the supporting strips 25 remaining beneath the load and accompanying it to its destination. The same frame may then be returned to the loading station to pick up another load. At the receiving end the above described operation is repeated, a similar frame being provided to pick the load up from the vehicle floor and convey it to its ultimate destination.

It will be obvious that the loaded frame may be handled by a wide variety of hoisting and conveying apparatus now in common use. It may be slung from overhead lifting gear or picked up by a type of conveyor known as a lift truck which has built into it either manual or power-driven means for jacking up heavy loads. According to a further embodiment of the present invention the frame itself may be provided with wheels and lifting gear, so that no accessories whatever are required to pick up and convey the load from one point to another, as will hereinafter more fully appear.

Figures 5, 6, 7, 8, 9, 10, 10A, 11, 11A, 12:
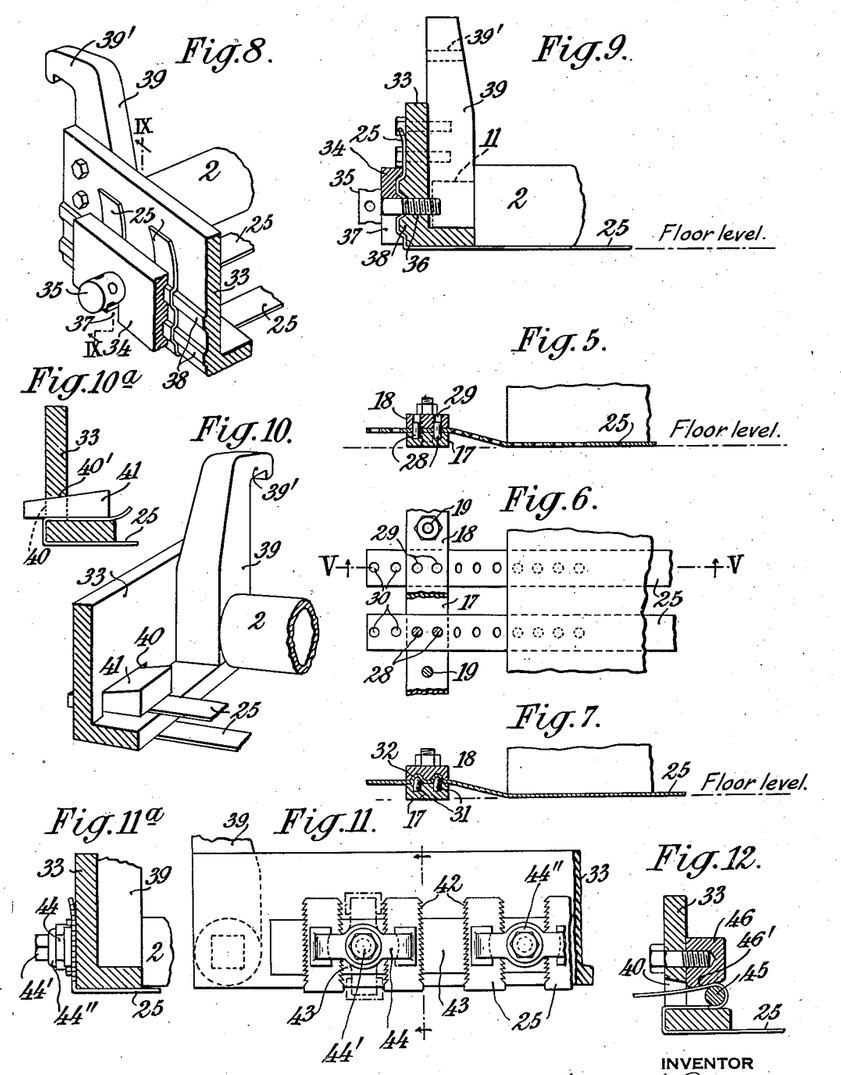
Figs. 5 and 6 are respectively a vertical cross-section and plan view showing details of a somewhat modified arrangement for anchoring the strip ends in a supporting frame analogous to that shown in Figs. 1 to 3, the sectional view in Fig. 5 being taken along the line V—V of Fig. 6.
Fig. 7 is a cross-section corresponding to Fig. 5 and shows a further modified arrangement for anchoring the strips to the frame.
Figs. 8 and 9 are respectively a perspective view and vertical cross-section showing details of a further modification of the clamping or anchoring means whereby the supporting strips are secured to the frame, the sectional view being taken along the line IX of Fig. 8.
Figs. 10 and 10a are respectively a perspective and vertical cross-sectional view of a further modification wherein the load-carrying strips are anchored to the frame by means of wedges.
Figs. 11 and 11a are respectively an end view and vertical cross-section showing details of a form of anchorage particularly adapted for securing marginally toothed strips.
Fig. 12 is a vertical cross-section of another form of anchorage for securing the strips to the frame members, this modified form of anchorage providing a rolling wedge lock which increases its gripping action on the strip in accordance with the tension applied thereto.

In Figs. 5 and 6 there is shown a somewhat modified arrangement for securing the ends of strips 25 between the clamping bars 17, 18, of the frame shown in Figs. 1–3. The strips, instead of passing beneath bar 17 and then around said bar, as seen in Fig. 3, are laid directly over the bar in position to be engaged by clamping bar 18. While it is somewhat simpler to thus position the ends of the strips, a more secure anchorage is required if heavy loads are to be carried inasmuch as the frictional snubbing action of the strip passing around the corners of the lower bar, as in Fig. 3, is lost. A very positive anchorage is afforded by providing steel pins 28 which are rigidly set in the lower bar 17 (Fig. 5) and project upwardly into corresponding recesses 29 in the clamping bar 18. The bands or strips 25 which carry the load may be perforated at regular intervals, the perforations 30 being spaced to fit over the pins 28 when the strip is placed in position. The strip material used for the pliant bed may have such perforations throughout its length so that it may be engaged at any desired point by the frame pins 28. If the strip is of relatively light gauge, the pins themselves cooperating with the clamping bar 18, may be utilized as punches, the tightening of the clamping bar 18 effecting the perforation of the strip.

For ordinary loads a very effective anchorage is obtained by pins 31 formed as shown in Fig. 7, which are similar to those shown in Fig. 5 except their ends are pointed or rounded and cooperate with correspondingly formed recesses 32 formed in the clamping bar in such manner as to produce small indentations in strips 25 when the latter are clamped between the frame members 17, 18.

It will be noted that when the strips are led directly to the upper surface of the frame bar 17, as indicated in Figs. 5, 6 and 7, the strips are not tensioned in a plane quite coincident with that of the floor upon which the load initially rests. It is therefore true that for loads requiring to be picked up on an ideally flat bed, the arrangement of strips whereby they are first caused to pass beneath a frame member at the level of the floor, as shown in Fig. 3, for example, possesses a distinct advantage. When such an ideally flat bed is required, the strips 25 shown in Figs. 5, 6 and 7, may be led beneath bar 17 and then into clamping position in the same manner as described in connection with the first embodiment.

A further modification is seen in Figs. 8 and 9, wherein there is substituted for the end frame bars 17, 18, of the frame described above, members 33 formed conveniently of heavy angle iron, the strips 25 being clamped against the vertical outer face of such member by a clamping bar 34. This bar is brought into clamping relationship with the end member 33 by means of a plurality of clamping screws 35 which are threaded into bores 36. To permit the insertion or removal of clamping bar 34 without removing screws 35, the apertures through which the screws pass are in the form of slots 37, which, being open at their bottom ends, permit the bar to be moved vertically into or out of operative position when the clamping screws 35 are merely loosened. If it is desired to achieve a more secure clamping effect than can be had with a simple flat bar, the clamping bar may be channeled, as shown, to receive correspondingly formed indenting bars 38 secured upon the face of end member 33. When the strips 25 are clamped between such member and bar 34 they are bent to conform to the outline of the cooperating clamping surfaces and are thus very securely anchored in position. It will be understood that except for the somewhat modified clamping arrangement above described, the frame members 33 are used in the same way as the end members in the first described embodiment, being assembled with the extensible side members 2 and acted upon thereby to effect the desired tensioning of the load-bearing strips 25. The "pick-up" members or lifting ears may be formed integrally with the end frame members 33 by bending up a section corresponding to 20 in Fig. 2, or separate blocks 39 may be secured to the frame ends, as seen in Figs. 8 and 9. These blocks may be of cast iron and formed to provide the lifting ears 39', the blocks also serving to reinforce the frame ends and provide a rugged connection for the side members 2, the ends of which are received within bores in said blocks, as shown.

Another showing of an end frame member similar to that described above appears in Figs. 10 and 10a, except that a further modified locking arrangement is provided for securing the strips 25 thereto. In this construction rectangular openings 40 are formed in the vertical wall of angle bar 33 at intervals therealong according to the number and arrangement of strips that are to be locked in the frame. The lower edge of each opening forms a continuation of the surface of the horizontal web of the angle bar while the upper edge 40' is preferably inclined, as shown, to provide a wedging surface corresponding with the inclination of locking wedges 41 which are set within the openings after the ends of strips 25 have been threaded therethrough. Each strip end passes around the bottom web of the angle bar and thence beneath the wedge so that an effective snubbing action is added to the locking effect of such wedge. The wedges are driven home to exert the desired clamping pressure upon the inturned strip ends 25, the wedges in this condition projecting somewhat beyond the face of member 33 so that they may be readily released by simply tapping the exposed wedge ends in the opposite direction.

In Figs. 11 and 11a there is shown a frame anchorage for strips having specially formed notched edges 42. This construction provides a plurality of marginally toothed anchor blocks 43 rigidly secured to the face of each frame beam 33. These blocks are spaced so as to receive between them the marginally notched, load-bearing strips 25. The strip ends are simply inserted between the said blocks 43 in the desired adjustment, the interengaging teeth of the strips and blocks affording a positive anchorage against endwise movement of the strips. The latter are prevented from being displaced from between the blocks by cleats 44 pivoted upon screws 44'. Each cleat may conveniently serve to hold two strips. After a pair of strips have been positioned between blocks 43, their cleat 44 is swung from the vertical dotted line position (Fig. 11) to the horizontal position shown, the cleat ends then bearing upon the strips. Pivot screws 44' may then be tightened to hold the cleat rigidly in strip-engaging position although the provision of a spring washer 44" beneath the head of screw 44' will normally afford sufficient friction to hold the cleat in the required position while permitting it to be turned manually to either position as required without altering the adjustment of screw 44'.

A further modified locking arrangement is shown in Fig. 12, wherein the angle bar 33, forming the end members of the frame, is apertured to receive the ends of strips 25 in the manner above described, there being substituted for the wedge lock shown in Figs. 10 and 10a, a round pin or rod 45. A bar 46 rigidly secured to the vertical wall of frame member 33 provides at its lower face an inclined wedging surface 46' separated from the horizontal face 47 of the angle bar to permit the wedging engagement therebetween of the pins 45 about which the strips 25 have been wrapped, in the manner indicated in Fig. 12. Each strip end is passed through an aperture 25, given a half turn about the pin or roller 45, and then brought out again through the aperture. By pulling on the projecting end 25' of the strip the pin 45 is caused to roll inwardly so as to wedge the strip between the relatively inclined surfaces 46, 46'. Thereafter, when the load is placed upon the strips, any tension developed therein will tend to draw the pins or rolls 45 into more secure wedging relationship with the confining surfaces, the wedging or locking effect being thus proportional to the load applied to the strips. After the load has been conveyed to the desired point and the tension upon the strips relieved, the pins 45 are readily tapped out of locking engagement with the confining surfaces 46, 46', by means of an instrument which is inserted through apertures 25.

Figures 13, 14, 15, 18:
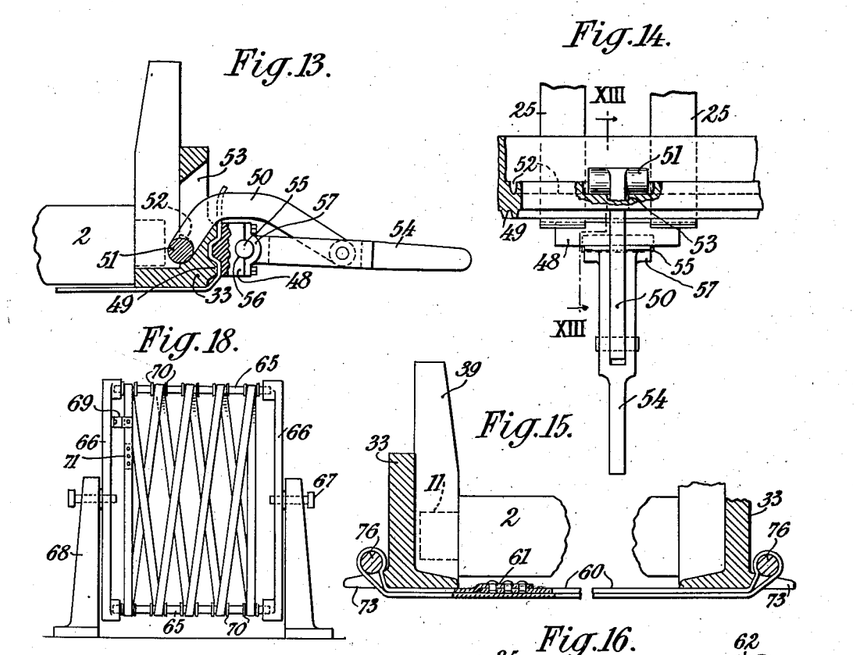
Figs. 13 and 14 show respectively a vertical cross-section and plan view of a toggle lock providing a further modified means for anchoring the strips, Fig. 13 being taken along the section of line XIII—XIII of Fig. 14.
Fig. 15 is a vertical cross-section through the end members of a frame wherein the supporting strips are endless loops and may therefore be anchored to the frame by a simple pin connection.
Fig. 18 is a front elevation of a winding frame upon which the strip bed may be pre-formed in various patterns.

In the further modification shown in Figs. 13 and 14, a toggle lock is provided to clamp the strips 25 to the end members of the frame. Again in this instance it will be understood that the expansible side members performing the function of frame members 2 in the first described embodiment, are provided to tension the strips after they have been secured in the frame, the two frame ends 33 being formed of angle bars or other suitably strong structural sections. The actual clamping members 48 perform the same character of strip-bending operation as that effected by the clamping bar 34 in Fig. 9 except that instead of being moved by screw means into clamping engagement with the cooperating ribs 49 secured on the face of end member 33, they are clamped by means of toggle levers. Any required number of these toggle arrangements may be provided. Each consists of a link 50 having formed at one end a cylindrical T head 51 which bears against a cylindrically grooved channel 52 extending along the inner face of frame member 33. The link extends through a vertical slot 53 in said member and at its outer end is pivoted to a lever 54. This lever is divided toward its inner end to receive link 50 and is fulcrumed to the clamping member 48 as shown, the inner end of said lever being provided with a cylindrical T head 55 similar to the head 52 on link 50, the cylindrical head being retained within a rounded groove 56 formed i clamping member 48 by means of bearing caps 57 secured thereto. In the example shown in Fig. 14 the clamping member 48 serves to anchor two of the load-supporting strips 25. Except where the strips are required to bear exceptionally heavy loads, the toggle lever arrangement above described is sufficiently powerful to effectively clamp a greater number of strips. Indeed for all but the heaviest loads a single clamping bar may extend the entire width of the frame, the bar being locked in clamping relationship with the series of strips by only two of the toggle lever locks above described.

The operation of the toggle lock shown in Figs. 13 and 14 requires but relatively small effort to effect a very secure anchoring of the strips. After the frame has been assembled, the strips are turned upwardly about the end members 33, the clamping bar or bars 48 at this time being swung away from said end member by elevating the toggle levers 54. Thereafter the downward movement of the end of each toggle lever 54 causes bar 48 to advance into clamping engagement with the cooperating surface of end member 33, the final travel of the lever carrying toggle pivot 58 slightly beyond dead center, i. e., the line extending through the centers of pivots 52 and 55, so that the toggle becomes self-locking, in a manner well understood. In such position the link 50 comes in contact with the upper surface of clamping bar 48, as seen in Fig. 13, thus holding the parts in locking relationship. The toggle locks are released by a slight upward movement of the end of levers 54, and thereafter clamping bar 48 may be swung clear of the strips by raising the lever to upright position, link 50 at the same time swinging upwardly about pivot 52.

Figures 16, 19:
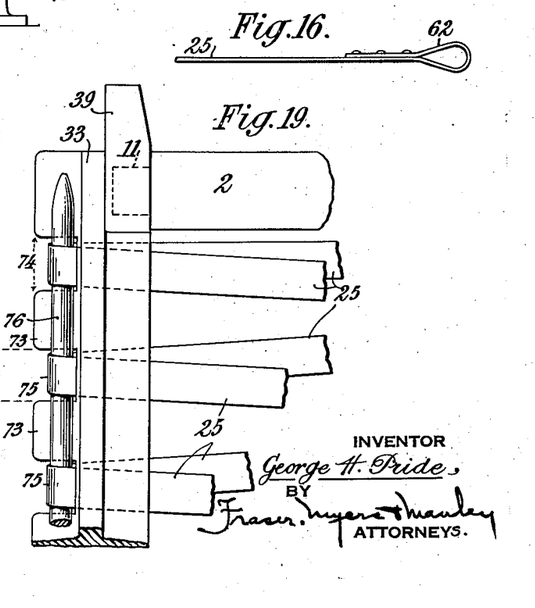
Fig. 16 shows a modified arrangement of loop formed in the ends of a single strip which may be employed in place of the looped double strip shown in Fig. 15.
Fig. 19 is a plan view showing details of the looped strip anchorage appearing in Figs. 15 and 17.

Instead of providing simple flat-ended strips which require to be engaged by some form of locking or clamping device, of which various examples have been hereinbefore described, the strips may be so formed as to provide looped ends which may be anchored to the frame by a simple pin or bar. As shown in Fig. 15, each supporting strip may be formed into a continuous loop 60, the strips ends being secured together at 61 by any suitable means, as, for example, by riveting or welding, or by any of the well known methods by which the ends of baling strips are secured together. A number of machines specially designed for thus joining the ends of metal strips, are now in common use and need not here be described. Obviously an analogous strip anchorage may be had by simply providing a loop 62 at each end of the individual strips, as shown in Fig. 16. Furthermore, a single length of strip material may be wound continuously back and forth between the frame members to provide a pliant bed having a pattern such as that shown in Fig. 17, for example. In this case the two free ends 63, 63', of the supporting strip 25 may be looped, as shown in Fig. 16, to provide fixed anchoring eyes, the strip also forming loops intermediate its ends at each of the points 64 where it is anchored to the frame ends. A bed or web of this character may be conveniently pre-formed by winding the strip on a rotatable frame, as shown in Fig. 18. The end members of this frame may consist of simple round bars 65 which fit within sockets formed in the ends of side members 66. The side members are pivoted at their centers upon pins 67 removably mounted in stationary supporting arms 68. In winding the strip stock upon the frame, the end of the strip may either be secured over one of the end bars 65, as by a fixed loop such as shown in Fig. 16, or it may be temporarily held by a screw clamp 69 mounted on frame member 66. The frame is then rotated and the strip wound thereon either in the crisscross pattern indicated in Fig. 18, or the zigzag pattern of Fig. 17, the winding frame obviously lending itself to various arrangements of the convolutions of the strip. To insure the desired spacing of the successive turns of the strip about the frame ends, spacing rings 70 may be affixed thereto at the required intervals. If the strip 25 is wound as shown in Fig. 18, it will be carried on its successive turns across the frame and then back again, the last end of the strip being joined to the starting end at the point 71, as by riveting, welding or other suitable means. To prevent the unbending or displacement of the intermediate loops upon the removal of the completed bed from the winding frame, the overlapping portions of the strip adjacent to each loop may be fastened together, as by riveting or binding with cord or wire. The entire strip bed may also be bound into a mat by cementing or otherwise securing the strips to one or more sheets of cardboard or other material, as described in connection with the mat shown in Fig. 4. If desired, the pre-formed strip bed made as above described may be transferred while still supported by the winding frame directly to the point where it is to be used and the goods loaded thereon. For goods that do not require an exceptionally strong carrying frame, it is practicable to utilize the above described winding frame 65, 66, as a support for the loaded bed. If a heavier frame is required to effectively tension the load-supporting strips, the pliant bed formed as above described may be picked up by a more rigid tensioning frame such as that hereinbefore described.

Figure 17:
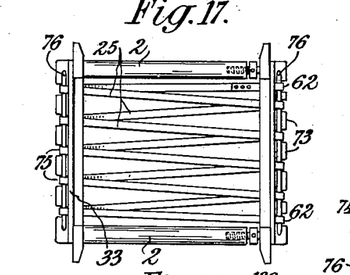

In Figs. 15 and 19, details of a frame suitable for holding looped strips are shown, the entire frame appearing in Fig. 17, the construction according generally with the frames hereinbefore described except that no clamping means are required to anchor the strip to the frame ends. The end members 72 at each end of the frame are connected by expansible side members 2, as hereinbefore described. Each end member is preferably of inverted T bar cross-section, the outwardly-extending web or flange 73 thereof being cut away at intervals to provide openings or notches 74 through which the looped ends 75 of strips 25 may upwardly project, as best seen in Fig. 15. Before the frame is extended to tension the strips, a bar 76 is passed through the strip loops, the bar being supported at intervals throughout its length upon the web or flange projections 73. It may be convenient in certain instances to utilize the same bars upon which the strip bed has been pre-formed, these being transferred directly from the winding frame, such as shown, for example, in Fig. 18, to the present carrying frame while still threaded through the loops of the pre-formed strip bed. Obviously the bar 76 need not be in one piece but may consist of a series of pins sufficiently long to bridge the openings 74 through which the strip loops project. Because of the fact that the bar 76 is supported throughout its length at points closely adjacent to the sections which receive the strip tension, the bar (or individual pins which may be substituted therefor) will be sufficiently strong if made of wood, except when carrying exceptionally heavy loads. The bar or pins may be left threaded through the strip loops when the frame is not present, as, for example, during the shipment of goods from one point to another after the frame has been removed and the goods are simply lying on the strip bed. This has the advantage of eliminating the manual operation of inserting the bars 76 or equivalent loop-engaging means each time that the load is picked up by the frame.

A further embodiment of the present invention, as shown in Figs. 20 to 23, inclusive, comprises a rigid frame provided with wheels and built-in lifting means by which a load of goods disposed upon a pliant bed may be picked up and conveyed from one point to another. Three sides of the frame are formed of heavy channel beams rigidly secured together in the form of a U-shaped structure. The two longitudinal beams 80 are permanently connected through the end beam 81 and at the opposite end are bridged by a removable beam 82 when the frame is completely assembled. Adjusting means are provided to move the end beam 82 longitudinally of the frame so that the pliant bed upon which the load of goods is disposed may be tensioned between the end beams 81, 82, in a manner analogous to the operation of the tensioning frames hereinbefore described. In the present embodiment, the bed, consisting of parallel strips 25, is shown by way of example, although it will be understood that any suitable form of pliant bed may be employed, the various arrangements of strips shown in Figs. 17 and 18 affording other examples of beds well adapted for use in the present frame.

In this construction a somewhat modified strip-locking arrangement is provided. The strip ends are clamped between a clamping bar 83 and the outwardly-extending flange or web 84 of the end frame beams 81, 82. Each of the clamping bars 83 is bent upwardly at its ends to provide arms 85 through which the bar is pivotally supported, as by means of pivot pins 86 mounted in brackets 87 which are secured to the vertical walls of end beams 81, 83, respectively. Levers 88 rigidly secured to the upturned arms 85 of each clamping bar 83 are provided to swing the bars outwardly away from the frame beams so that the ends of strips 25 may be disposed in position to receive the clamping action of said bars. With the strip ends thus positioned, the operator depresses the lever 88, thus swinging the clamping bar inwardly so as to draw the upturned ends 25' of strips 25 into the position shown in Fig. 21. The clamping bar is then tightened down on the strips by means of clamping nuts 89. While five of such nuts are shown, it will be understood that except for unusually heavy loads an adequate strip-clamping effect may ordinarily be obtained by tightening but two or three of the nuts. These nuts may be of the capstan head type which are rotated by inserting a small bar through transverse bores 89' provided for that purpose (Fig. 22), or they may be of other forms adapted to be operated by wrenches of either the manual or power-driven types. The nuts are threaded on vertical studs 90 rigidly secured in the bottom web 84 of the frame ends. In order to permit the clamping bar 83 to swing into and out of clamping position, open ended slots 91 are formed therein, these slots being so disposed as to freely receive the studs 90. To permit the clamping bar 83 the slight vertical movement required to swing over the strips and then be brought into secure clamping relationship therewith, the upturned arms 85 of the clamping bar are loosely pivoted. This is conveniently accomplished by providing a vertically elongated aperture 92 in the said arms through which the fixed pivot pins 86 project.

As in the previously described embodiments, provision is made for effecting relative movement of the frame members between which the pliant bed is anchored, whereby to effect the tensioning of such bed. To this end the removable bridge beam 82 is mounted upon plates 105 which are slidably guided within the channels of side frame beams 80. As best seen in Fig. 23, these plates are of such cross-section as to be horizontally guided between the upper and lower webs of the channel beam, the plates being retained in the channel of each beam by upper and lower guide bars 106 which are rigidly secured along the inner faces of the beam webs or flanges.

Figures 21, 22:
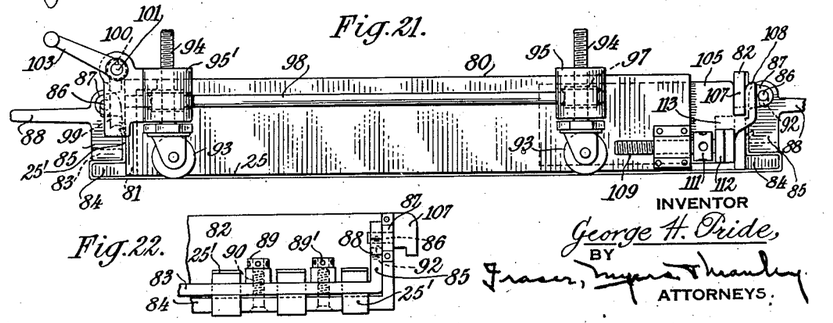
Fig. 22 is an end view of the removable bridge member which connects the two sides of the U-shaped frame, as shown in Figs. 20 and 21.
Figure 25:
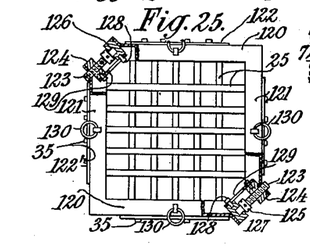

The removable end member or bridge beam 82 is preferably connected to the slide plates 105 by a simple interlocking joint which may consist, for example, of hooked ears or projections 107 extending from the ends of beam 82 and formed integrally therewith, the said projections sliding vertically into engagement with the corresponding hook-like projections 108 formed in the ends of slide plates 105. It will be apparent that these hooked projections 107, 108, need not provide a rigid interlock inasmuch as the U-shaped frame is in itself an inherently rigid structure. Such tolerances are therefore permissible between the interfitting parts 107, 108, as to permit the free handling of the removable frame beam 82. This beam is connected to the slide plates 105 by simply lowering it into the position where the hooked ends interengage, as shown in Figs. 20 and 21, and such engagement may be effected regardless of slight differences in the degree of extension of the adjustable slide plates 105.

After the end beam has been hooked to the slide plates 105, the strips 25 of the pliant bed then being anchored between said beam and the beam 81 at the opposite end of the frame, the bed is placed in tension by means of tensioning screws 109. These screws are threaded in brackets 110 rigidly secured to the side members 80 of the U frame and are provided with capstan heads 111 or other suitable means for effecting their rotation. The projecting ends of screws 109 bear freely against abutment blocks 112 rigidly secured to the slide plates 105, corresponding blocks 113 being provided on the inner faces of said plates to increase the bearing surface which transmits the thrust of screws 109 to the end beam 102. The abutments and blocks 112, 113, may be welded to the slide plates 105 or otherwise secured thereto, as by means of screws 114 which extend through each block and its slide plate, the screws being threaded into the abutment 112 on the opposite face of the plate.

In passing it may be noted that while the above described arrangement whereby the bridge beam 82 is detachably connected to slides 105 materially facilitates the handling of the assembly of the frame, particularly in close quarters, a generally similar effect would be obtained in a construction wherein the slides 105 are permanently secured to the end beam 82. In the latter case the said beam would be removed from the U frame by moving it endwise a sufficient distance to withdraw the slide plates 105 from their guide-ways within the ends of the U frame.

The U-shaped rigid frame 80, 81, is provided with four caster wheels 93 which are swiveled upon vertical screw lifting elements 94. In the preferred construction the four wheels are simultaneously controlled so that the frame may be raised or lowered without any tilting movement. The lifting screws 94 do not revolve but are vertically guided in suitable bores formed in rigid "pick-up" members or supporting brackets 95, 95', rigidly secured to the frame beams. Rotation of the screws is prevented by the usual fixed key or spline 96 sliding within a vertical groove in the screw. Each screw is engaged by a nut 97 which also constitutes a worm wheel, the periphery of said nut having worm teeth cut therein, as best seen in Fig. 23. The said worm wheel nut is retained between the rigid abutment surfaces of the bracket 95. The worm wheels are driven by worms 97 mounted on shafts 98 extending along each side of the frame, suitable bearings being provided in each of the four brackets for supporting the said worm shafts.

At the left hand end of each of the worm shafts 98, worm wheels 99 are secured, the latter meshing with driving worms 100 secured on a transverse driving shaft 101 (Figs. 20 and 21). Suitable bearings for this shaft are provided in the gear housings or brackets 95', the ends 102 of the said transverse shaft 101 projecting beyond said brackets and being squared to receive an actuating crank 103 or other suitable means for rotating the shaft whereby to effect the simultaneous operation of the four worm driven screws. The operation of the foregoing embodiment may be briefly summarized as follows:

A load of goods, represented by the broken line L, is deposited upon the pliant bed 25, which may consist of metallic strips 25 in various arrangements, as hereinbefore set forth, depending upon the weight and character of the load. The arrangement shown in Fig. 20 is well adapted for handling heavy loads of paper sheets, although it is obviously suitable for case goods, building materials, such as hollow tile, and a wide variety of other articles which may be bound together in stacks or otherwise, in accordance with the particular handling or shipping conditions involved in each case. When the load is to be picked up, the U-shaped frame with the bridge beam 82 removed, is rolled into position to embrace the load, the frame then being lowered by operation of the crank 103. The bridge member 82 is then slipped into place and the ends of the load-bearing strips 25 clamped or anchored to the beams 81, 82, in the manner previously described, it being understood that the particular anchoring means described in connection with the present embodiment is but one example of means suitable for this purpose. Various other arrangements for clamping or anchoring either single or looped strips may be used in conjunction with the present frame, as hereinbefore set forth. The bed having been secured in the frame, it may be placed under any desired tension by the operation of adjusting screws 109, which effect relative movement of the end beams. Thereupon the load is elevated from the floor or supporting platform by the operation of the lifting gear, rotation of crank 103 effecting the simultaneous actuation of the four screw lifting devices so that the frame with its loaded bed is rollingly supported upon the wheels 93. The frame is then freely mobile and may be moved to any desired point. The load is then dropped and the frame removed, the pliant bed remaining beneath the load ready to again be picked up, when, after storage or shipment, as the case may be, it is required to be moved from the floor or platform on which it has been deposited.

The above described U-shaped frame advantageously lends itself to cooperative use with the tensioning frames herein previously described. Such U-frame, with the screw lift wheels as above described, may be utilized as a supplementary frame to pick up a load of goods disposed on a pliant bed which has been previously anchored in a tensioning frame, such as, for example, the frame shown in Figs. 1 to 3, inclusive. When employed in this manner the removable end or bridge member 82 of the frame shown in Figs. 20 and 21 is not required, the U-frame being left open at one end so that it may be rolled upon its wheels or casters 93 into a position where it embraces the loaded frame corresponding to that shown in Figs. 1 to 3, the side members 80 of the U frame being disposed in such position that when the frame is elevated by the actuation of its screw lift gear, the side members 80 will engage the "pick-up" members or lifting ears 20 of the loaded frame, a further slight elevating movement picking up the load, the weight of which is thus transferred to the wheeled frame. The load, which is then freely suspended, may be moved to any desired point, the inner or tensioning frame being thereupon deposited with its load of goods by a reverse rotation of the screw lifting gear.

From the foregoing it will be apparent that the tensioning frame according to the present invention may itself comprise the desired lifting and rolling facilities for imparting mobility to the load disposed upon the pliant bed, or the tensioning frame per se may be of the simple construction shown, for example, in Figs. 1 to 3, mobility being imparted thereto by a supplementary carrier adapted to pick up and move the tensioning frame as required.

For certain purposes a rolling frame similar to that shown in Figs. 20-22 may be used for picking up loads without the special gear for changing the elevation of the wheels. In this case the wheels or casters would be permanently mounted so as to carry the frame at the required elevation, the tensioning screws 109 being utilized to effect the required elevation of the pliant bed after the latter had been anchored in the frame ends, as hereinbefore described. It will be apparent that the tensioning of the strips would cause them to rise from the floor or supporting surface substantially to the level at which their ends are engaged by the frame beams. As thus used the frame would be supported on its wheels at such elevation above the floor or loading platform that the tensioning of the load-supporting strips between the frame ends would sufficiently elevate the load to transfer its weight to the frame. After the loaded frame is rolled to the point where the load is to be deposited, the load is lowered by simply turning the tensioning screws 109 until the slackening of the strips permits the load to rest upon the floor. The strips are then released from the frame clamps and the frame removed, as hereinbefore set forth.

The use of the bed-tensioning screws as a means for elevating the bed is not desirable where the load disposed thereon is of such a character as to require substantially flat and rigid basal support, but may conveniently be employed in picking up a solid object, such as a block of building stone or a packing case, which is sufficiently rigid to withstand the unevenly distributed strains imposed during the operation of drawing taut the supporting strips of the pliant bed, it being apparent that until the strips had been drawn sufficiently tight to present a substantially flat carrying surface, the load would be supported principally along its edges where the strips bend upwardly toward the frame bars.

It will be understood that the use of the frame referred to in the two preceding paragraphs differs from that hereinbefore described. In the handling of loads requiring a substantially flat supporting bed, a most important feature of the present invention resides in the provision of a frame wherein the bed may be tensioned in a plane substantially coincident with the basal plane of the load while the latter is supported by the floor or loading platform, the frame with its flat tensioned bed then being elevated to pick up the load. It is only when picking up an inherently rigid body or a load of goods in which deformation or derangement of the component parts is immaterial, that the frame may be carried at an elevation above the floor and the load drawn up to the frame level by taking out the slack in the load-supporting strips, as set forth in the last two paragraphs above.

While it will be understood that a frame providing for the tensioning of the load-carrying bed in only one direction affords an ideally simple and effective embodiment of the present invention, the frame may, if desired, be of such character as to permit of tensioning a pliant bed both longitudinally and transversely.

An example of such modification is shown in Fig. 24; the frame in this case being made in two similar right angle frame sections, each formed by rigidly joining the ends of channel beams 120, 121, at two diagonally opposite corners. Two sets of load-supporting strips 25 are anchored respectively to the oppositely-disposed frame members 120 and 121 to provide a square mesh bed susceptible of being tensioned in the frame both longitudinally and transversely. Strips 25 may be anchored to the frame members by clamping bars 122 identical with those shown in Figs. 8 and 9, or by other suitable means of which various examples have been hereinbefore fully set forth. After the strips are anchored to the frame the two halves thereof are forcibly separated by the action of adjusting or tensioning screws 123 diagonally interposed between adjacent ends of the right angle frame sections. The said screws and their mountings may be identical with those shown in Fig. 1, for example, except that in the latter case the screws 3 act parallel to the sides of the frame, whereas in the present construction the screws 123 are disposed diagonally. Each screw is threaded into a block 124 rigidly mounted at the end of its frame member 121, the cylindrical end of the screw projecting beyond its capstan head 125 and seating within a bore 126 formed in bearing block 127. This block is rigidly mounted in the end of frame member 120. It will be understood that the two screws and their frame mountings are identical, the present description applying equally to each.

To render the frame more rigid, bracing plates 128 may extend between the aligned inner faces of end blocks 124, 127, the plates being permanently secured to blocks 127. One or more screws 128 extending through horizontal slots 129 in said plates permit the latter to be securely clamped to end blocks 124 after the frame has been expanded by the operation of screws 123 to effect the required tensioning of the strips. The frame with its sections thus locked together affords a structure in which both the longitudinal and transverse strips may be held rigidly in tension. Such frame may be provided with caster wheels and built-in lifting gear, as hereinbefore described, or it may be handled in any other suitable manner as by means of hoisting tackle engaging "pickup" members such as rings 130 secured in each of the frame beams.

The term "shipping" as used in the appended claims refers broadly to the art of conveying commercial loads. This may involve the shipment of goods to a remote destination by any suitable means of conveyance, the transfer of goods from one conveyance to another, or merely such handling as may be required for conveying a load of goods from one point to another within a single plant, as, for example, in various warehousing operations.

In the claims appended hereto the term "shipping platen" designates that part of a load-carrying system upon which the load is conveyed from one point to another, and which, when anchored in a frame or carrier in accordance with the present invention, is capable of supporting the load primarily by virtue of its tensile strength, as distinguished from the load-bearing beds or skid-platforms hitherto employed, wherein the inherent rigidity of the bed itself supports the load. The term "shipping platen" is to be understood to include broadly any reasonable equivalent of the various forms of tensile load-bearing beds hereinbefore described, whether made in one piece or composed of a plurality of sheets, strips or other forms of material having the requisite tensile strength. And it will furthermore be understood that the invention is not otherwise limited to the constructions hereinbefore described and illustrated in the accompanying drawings, but may be variously modified and embodied without departing from the spirit of the invention as set forth in the following claims.

What I claim is:

1. Shipping apparatus for loads requiring a basal support which affords substantial resistance to deformation, said apparatus comprising a shipping platen on which a load is transported, said platen being formed of metal of such light gauge that the platen itself has insufficient rigidity to afford the requisite resistance to deformations when marginally lifted, the loaded platen during transportation resting on a supporting surface of the transporting vehicle, a carrying frame for imparting the required resistance to deformation to said platen when transferring the loaded platen to or from said surface, and means for detachably anchoring opposite portions of said platen to said frame whereby the latter may be removed from the platen after effecting the transfer thereof, thus freeing the frame for use with other platens.

2. Shipping apparatus comprising a load-carrying shipping platen formed of metallic strip material having insufficient inherent longitudinal rigidity to afford the required basal support for freely carrying the load, the loaded platen being adapted to be shipped while supported by the surface of a conveyance, and a detachable carrying frame disposable around the base of said load, the said frame being adapted to receive and terminally anchor said platen whereby the platen when elevated by upward movement of said frame will act to basally support the load without material deformation.

3. Shipping apparatus according to claim 1, further characterized in that the load-carrying platen comprises a plurality of flat metal strips arranged to basally support the load at required intervals, the said frame comprising four separable members adapted to be fitted together about the platen to provide a closed rectangular frame, the members of said frame when in assembled relationship, extending along and being included within a plane substantially coincident with the basal plane of the load.

4. Shipping apparatus according to claim 1, further characterized in that the said carrying frame is adapted to be opened along at least one side to permit the members of said frame to be moved into cooperative relationship with the platen after the latter has been loaded, without having to lift any part of the frame over said load, the frame when closed, providing a platen-supporting structure continuously surrounding the load in a plane substantially coincident with the basal plane of such load.

5. Shipping apparatus comprising a frame, a platen extending between the lower surfaces of opposite members of said frame, and movable frame-engaging means for detachably securing the ends of said platen to said frame beyond the point where said ends pass beneath the frame members.

6. Shipping apparatus comprising a frame, a shipping platen, opposite ends of said platen engaging and passing beneath members of said frame at substantially the level of the loading floor, means for detachably securing said opposite ends of the platen to the frame, and mechanical means for elevating the frame with its loaded platen from the said loading floor.

7. Shipping apparatus comprising an extensible frame, a light-gauge metallic shipping platen detachably secured between opposite members of said frame, means for forcibly effecting relative movement of said frame members whereby to tension the said platen in a substantially flat plane while said platen is supported on a loading surface, and mechanical means for elevating said frame, said frame-elevating means and platen-tensioning means being independently operable.

8. Shipping apparatus comprising an extensible frame, a load-carrying shipping platen, opposite end portions of said platen engaging corresponding members of said frame at substantially the level of the loading floor, adjustable means for detachably connecting said platen to the relatively movable parts of said extensible frame, means for forcibly extending said frame whereby to tension the platen and maintain it substantially flat when supported exclusively by said frame, and mechanical means for elevating said frame, said frame-elevating means and platen-tensioning means being independently operable.

9. The apparatus according to claim 8, further characterized in that the said frame extending means consist of screw-threaded elements operatively interposed between the relatively movable parts of said frame.

10. Shipping apparatus comprising a load-carrying shipping platen, an extensible frame adapted to be freely opened to permit of its being positioned about the load without the necessity of lifting any part of the said frame over said load, means for detachably securing opposite end portions of the platen to said frame after the latter has been closed about the load, and screw means for expanding said frame to tension said platen, the said frame when the platen is released being free to be opened independently of the operation of said screw means.

11. Shipping apparatus comprising a load-carrying platen, a sectional frame adapted to be closed about the loaded platen, means for detachably securing opposite end portions of the platen to said frame, and adjustable means carried by said frame for forcibly tensioning the platen, the said frame when the platen is released being free to be opened independently of the adjustment of said means for tensioning the platen.

12. Shipping apparatus comprising a shipping platen, a demountable frame, screw means adapted to adjustably elongate said frame, the platen being secured to the said frame and tensioned by its elongation, and interfitting parts freely insertable one within the other for demountably connecting the frame members independently of the adjustment of said screw means, said parts being positively held in interfitting relationship by the tension in said platen.

13. Shipping apparatus comprising a sectional frame having rigid end members and separate extensible side members, a shipping platen detachably secured between said end members, the said side members comprising rigid tubes and screw-threaded extension elements screwed therewithin, each of said elements projecting so as to engage an end member of the frame, and means disposed between the said end members for effecting relative rotation between said tubes and their said extension elements whereby to elongate the frame and tension the platen, the end members of said frame being removable when the platen is released regardless of the adjustment of said screw-threaded elements.

14. Shipping apparatus according to claim 13, further characterized in that the said extensible side members of the frame also comprise telescoping sections slidable one within another, and locking means for holding said sections in various relative adjustments whereby to facilitate rapid changes in the length of the frame preparatory to the final screw adjustment thereof.

15. A load handling device comprising a frame, a shipping platen adapted to be detachably anchored in said frame, said platen being formed of tensilely strong but flexible metal strips and having insufficient rigidity to freely support the load except when anchored in said frame, and means operative upon said frame at a plurality of points to raise and lower said frame whereby to pick up the platen anchored therein or to deposit said platen with its superimposed load.

16. A load handling device comprising a frame, a platen adapted to be detachably anchored in said frame, and adjustable lift and rolling gear for said frame, comprising a plurality of wheels, supports adjustably connecting said wheels with the said frame, and means for forcibly adjusting said supports whereby to change the elevation of said frame relative to said wheels.

17. A load handling device comprising a platen, a wheel-supported carrier adapted to hold said platen in suspension so that it may be freely transferred from point to point, and adjustable means adapted to change the elevation of said platen relative to the wheels of said carrier whereby to effect the raising and lowering of said platen to separate it from, or deposit it upon, the surface upon which the carrier is supported.

18. A load handling device comprising a U-shaped frame, a removable member bridging the open end of said frame, a platen adapted to be detachably anchored between said member and the opposite end member of said frame, lifting wheels adjustably connected to said frame and disposed so that their vertical relationship to the frame may be adjusted to carry said frame either at such elevation that the platen anchored therein is freely suspended above the floor or lowered into contact therewith.

19. The device according to claim 18, further characterized in that the said adjustable lifting wheels are mounted at the lower end of vertical screw-threaded columns, nuts rotatably carried by the said frame being provided to operatively engage said threaded columns whereby, upon rotation of said nuts, the required vertical adjustment of the frame is effected.

20. The device according to claim 18, further characterized in that means are provided for simultaneously adjusting the said lifting wheels, such means comprising a vertical adjusting screw for each of said wheels, nuts rotatably carried by said frame, each of said nuts operatively engaging one of said screws, gearing for rotating each of said nuts, and transmission means for simultaneously driving said gearing.

21. Shipping apparatus comprising a frame, and a shipping platen adapted to be detachably anchored in said frame, said platen comprising a plurality of tensilely strong but pliant metal strips, and a web of weaker material connecting said strips intermediate their ends whereby to hold said strips in predetermined relationship and permit of their being handled as a continuous mat before being anchored in the said frame.

22. Shipping apparatus comprising a frame, a shipping platen adapted to be secured in said frame, the material of said platen being formed to provide terminal loops at opposite ends, and anchor means adapted to be engaged with or disengaged from said loops without necessitating the opening of said frame whereby to detachably secure the platen in said frame.

23. Shipping apparatus comprising a frame, a shipping platen adapted to be detachably anchored in said frame, said platen comprising a continuous metal strip wound along different lines, such winding providing the platen with a plurality of terminal loops, and anchoring means passing through said loops and detachably connecting them to the frame.

24. Shipping apparatus comprising a frame, a metallic shipping platen formed of a plurality of metallic strips adapted to be detachably anchored in said frame, and a plurality of strip anchoring elements disposed at intervals along opposite sides of said frame, the terminal portions of said strips being formed to individually hook over said anchoring elements in various positions whereby to permit of readily assembling a platen of desired form by suitably anchoring the required number of strips in said frame.

25. Shipping apparatus comprising a carrying frame adapted to basally surround the load to be carried, a metallic shipping platen adapted to be detachably anchored in said frame and so disposed therein as to permit the platen to rest directly on a loading surface while anchored in said frame, cooperating sets of clamping elements carried by said frame, said elements being adapted to receive between them the free end portions of said platen, and clamp-actuating means for positively clamping the elements of each set together whereby to terminally anchor the said platen to the frame.

26. Shipping apparatus according to claim 25, further characterized in that one of the clamping elements of each set is mounted so that when not positively clamped it may be freely displaced from the position where it is subject to the positive action of the said clamp-actuating means, to a position more remote from the clamping surface of the cooperating clamping element, whereby to facilitate the rapid disposition of the platen ends therebetween.

27. Shipping apparatus comprising a frame, a pliant metal platen adapted to be terminally anchored in said frame, interfitting clamping elements carried by said frame, the said interfitting elements being so formed and mutually related as to deform the end portions of the platen when forced into clamping relation therewith, and clamp-actuating means adapted to forcefully engage said clamping elements with the said portions whereby to deform them and securely anchor the platen to the frame.

28. Shipping apparatus comprising a carrying frame, a shipping platen adapted to be detachably anchored therein in such position as to permit the loaded platen to rest directly on a loading surface while anchored in said frame, movable clamping bars at each end of said frame, and a plurality of screws adapted to move said bars into clamping relationship with the end portions of said platen when the latter are disposed between the frame-ends and said bars.

29. The device according to claim 28, further characterized in that each of the said screws are threaded into the frame-ends and project therefrom, the said clamping bars being marginally notched to permit of their being operatively interposed between the heads of said screws and the said frame-ends without removing said screws.

30. A device adapted to be used in shipping, comprising a frame, a platen adapted to be detachably anchored therein, movable clamping bars at each end of said frame, means adapted to forcibly move said bars into clamping relationship with the end portions of said platen, and additional means for moving said bars transversely to the direction of said clamping movement, the bars thus having the capacity of slidingly engaging and moving the adjacent ends of the platen into position to receive the final clamping action of said bars.

31. In the art of commercial shipping, the method of conveying loads composed of deformable or relatively displaceable goods which require to be carried upon a substantially non-deformable support, said method consisting in depositing the goods upon an inherently light and non-rigid shipping platen while said platen is temporarily supported in the required form upon a loading surface, thereafter bringing a movable carrier into position to engage said platen, then terminally anchoring said platen in the carrier while still supported by said surface, the non-rigid platen being of such tensile strength and so anchored as to be capable of freely carrying the load without substantial deformation when supported exclusively by such terminal anchorage, thereupon effecting relative vertical movement between the said carrier and the said supporting surface whereby to separate the loaded platen from said surface without materially deforming said platen, and then conveying said carrier and loaded platen to a remote point.

32. In the art of commercial shipping, the method of conveying loads which require to be carried upon a substantially non-deformable support, said method consisting in conveying the load upon a shipping platen which is terminally anchored and held taut in a detachable carrier, the platen being tensilely strong but so light and flexible that only when thus terminally anchored in said carrier is it capable of freely supporting the said load without substantial deformation, the loaded platen after being conveyed to the required point, being deposited upon a rigid load-bearing surface while anchored in said carrier, the said carrier being then detached and employed in transferring other loads.

33. In the art of commercial shipping, the method of conveying a load requiring to be carried upon a substantially flat support, said method consisting in shipping such load upon a tensilely strong but light and inherently non-rigid shipping platen resting upon the floor of a conveyance, and thereafter lifting said loaded platen from said floor by terminally anchoring the platen in a tension-sustaining carrier in such manner that the platen will be held substantially flat, and elevating said carrier, the inherently non-rigid platen then serving as a substantially non-deformable support for transferring said load.

34. In the art of commercial shipping, the method of conveying loads requiring basal support, consisting in disposing the load upon a shipping platen while the latter rests upon a rigid load-bearing surface, thereafter embracing said loaded platen with a movable carrier, terminally anchoring said platen in said carrier, tensioning the platen substantially flat in said carrier before the latter is elevated, and subsequently moving said carrier to lift the loaded platen and convey it to a remote point.

35. In the art of commercial shipping, the method of conveying loads requiring substantially unyielding basal support, consisting in supporting the load upon a shipping platen temporarily resting upon a rigid supporting surface, embracing said load with a movable frame, terminally anchoring said platen to parts of said frame on opposite sides of the load, applying tension to said platen in a plane substantially coincident with the plane of the supporting surface on which the platen temporarily rests, thereafter moving said frame to transfer the weight of said loaded platen to a rolling support, and conveying the frame and platen on said support to a remote point.

36. In the art of commercial shipping, the method of conveying loads requiring basal support, consisting in transporting the load on a tensilely strong but light and flexible metallic shipping platen resting on a rigid supporting surface of the transporting conveyance, the transfer of said platen to or from said surface being effected by anchoring the platen substantially flat in a tension sustaining frame and moving said frame, the latter being removed from said platen after such transfer and used for transferring other loads.

37. Shipping apparatus comprising an extensible frame in which shipping platens of various sizes may be anchored, said frame comprising cooperating frame members engageable in various longitudinal relationships whereby to alter the size of the frame in accordance with the size of platen to be used, securing means to connect said frame members in approximately the required relationship, and mechanical adjusting means adapted to regulate the degree of extension of said frame after the said frame members have been connected by said securing means.

38. Shipping apparatus comprising a shipping platen on which a load of goods may be transported, a lifting frame for said platen, anchoring means for detachably connecting opposite portions of said platen to said lifting frame, and pick-up members carried by said frame at an elevation sufficiently above its base to permit the operative interposition of suitable lifting mechanism between said members and the loading floor when the assembled frame and platen are resting on said floor.

39. Shipping apparatus according to claim 38, further characterized in that the said pick-up members comprise rigid bracket arms extending outwardly from said frame a sufficient distance to permit the introduction of mechanical jacking means between said arms and the loading floor whereby upon the operation of said jacking means the frame will be elevated and move the platen from the loading floor.

40. In the art of commercial shipping, the method of conveying loads requiring substantially undeformable basal support, consisting in depositing the load upon a shipping conveyance by means of a flexible but tensilely strong metallic shipping platen detachably anchored in a movable frame, said frame holding the platen sufficiently taut to impart to it the required resistance to deformation when freely supporting the load, thereafter detaching the frame from the deposited platen, and shipping said loaded platen on said conveyance to the desired destination.

41. In the art of commercial shipping, the method of conveying loads requiring basal support, consisting in shipping the load to a remote destination while resting upon a light but tensilely strong metallic shipping platen basally supported by the transporting conveyance, the load after reaching said destination being transferred by anchoring the platen substantially flat in a frame while thus basally supported, and moving said frame to transfer the said platen with its superimposed load, said platen as thus anchored in the frame affording the required basal support for freely carrying the load primarily by virtue of its tensile strength.

42. In the art of commercial shipping, the method of conveying loads requiring basal support, consisting in conveying a load to the required location while supported on a flexible shipping platen held substantially flat in mobile wheel-supported frame, then lowering said frame to deposit the loaded platen upon a receiving surface while said platen continues to be held substantially flat in said frame, and thereafter removing the frame from the loaded platen whereby to permit of the use of said frame for conveying other loads.

43. In the art of commercial shipping, the method of conveying loads requiring basal support, consisting in supporting the load upon a flexible shipping platen resting upon a load-bearing surface, then anchoring said platen substantially flat in a mobile wheel-equipped frame, then elevating said frame to freely support the loaded platen above said surface while said platen continues to be held substantially flat, and thereafter rolling said mobile frame on its wheels to convey the load to a remote point.

44. In the art of commercial shipping, the method of loading and conveying goods to a remote point while continuously supported in a substantially flat plane, said method consisting in initially supporting the goods upon a flexible metallic shipping platen resting upon a rigid loading surface, anchoring opposite portions of the loaded platen in a frame adapted to hold said platen in tension and thus sustain it in a substantially flat plane when the frame is elevated, then moving said frame so as to permit the introduction of a rolling carriage beneath the loaded platen, thereafter removing said frame and conveying the loaded platen on said carriage to a remote point.

GEORGE H. PRIDE.